Figure 4:
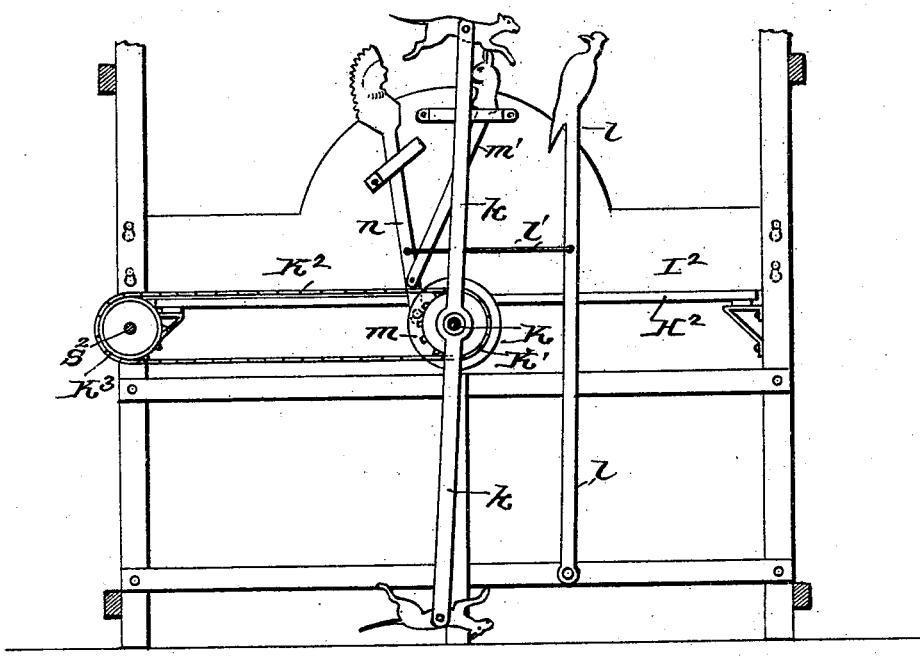

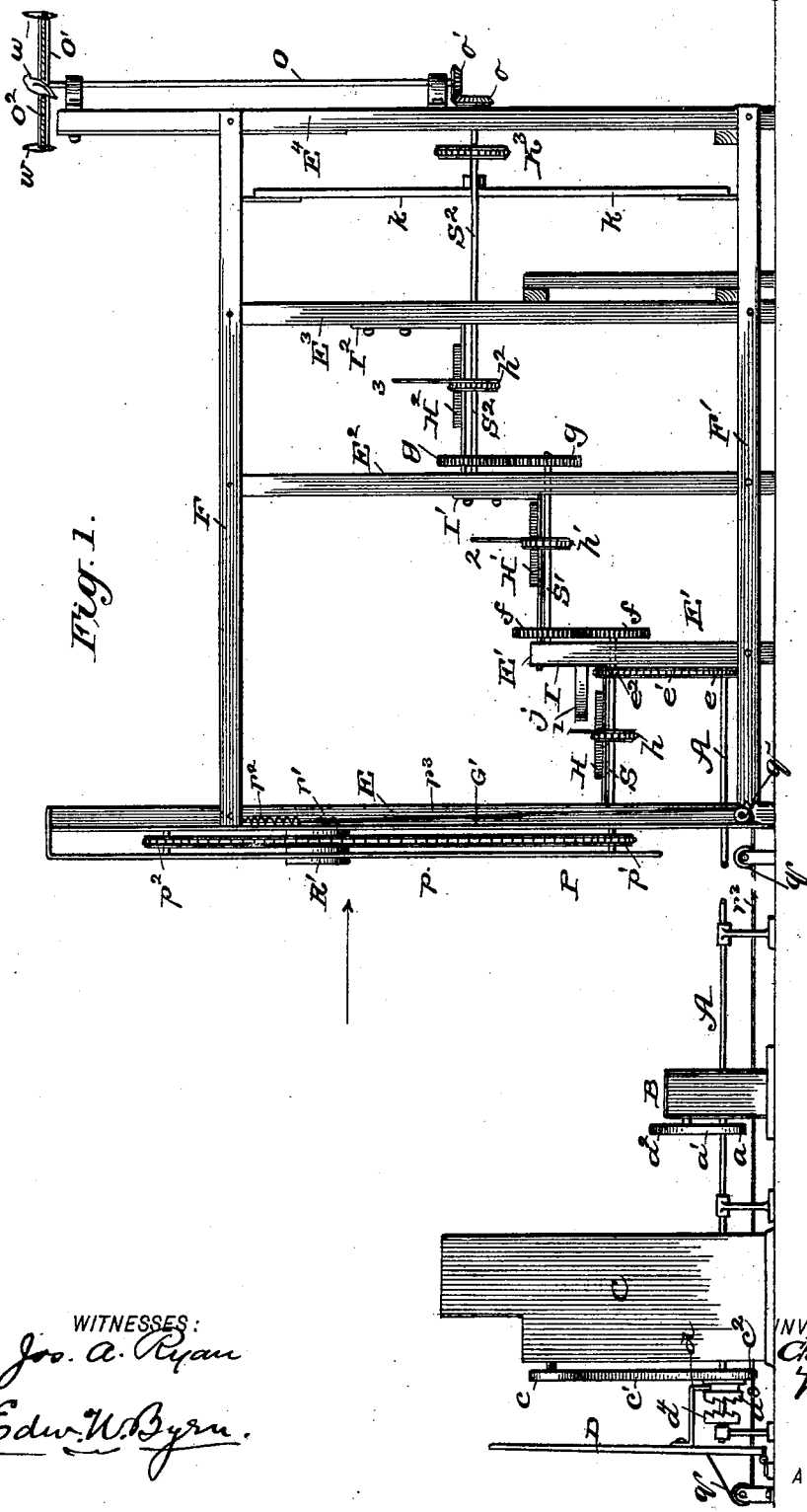

No. 631,720. Patented Aug. 22, 1899.
C. B. JEFFERS.
SHOOTING GALLERY.
(Application filed May 12, 1899.)
(No Model.) 4 Sheets—Sheet 2.
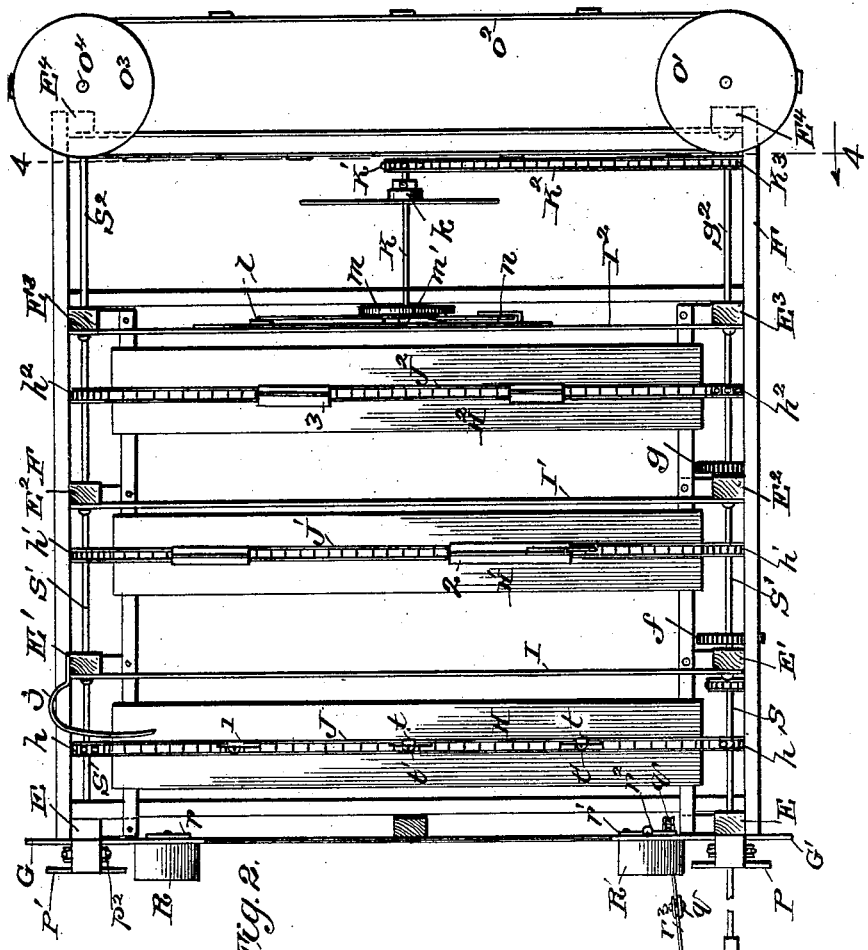
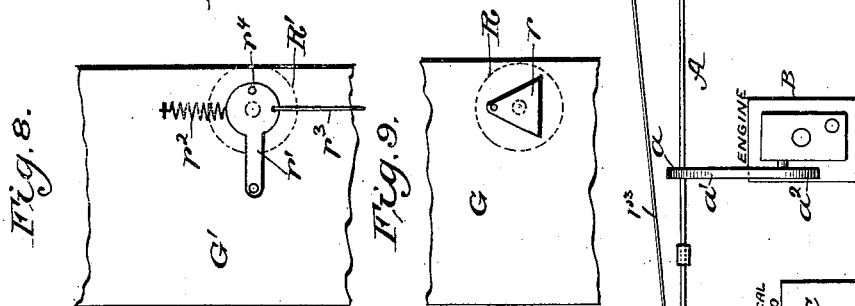
WITNESSES:
Jos. A. Ryan
Edw. W. Byrn.
INVENTOR
Charles B. Jeffers
BY Munn & Co.
ATTORNEYS.

No. 631,720. Patented Aug. 22, 1899.
C. B. JEFFERS.
SHOOTING GALLERY.
(Application filed May 12, 1899.)
(No Model.) 4 Sheets—Sheet 3.
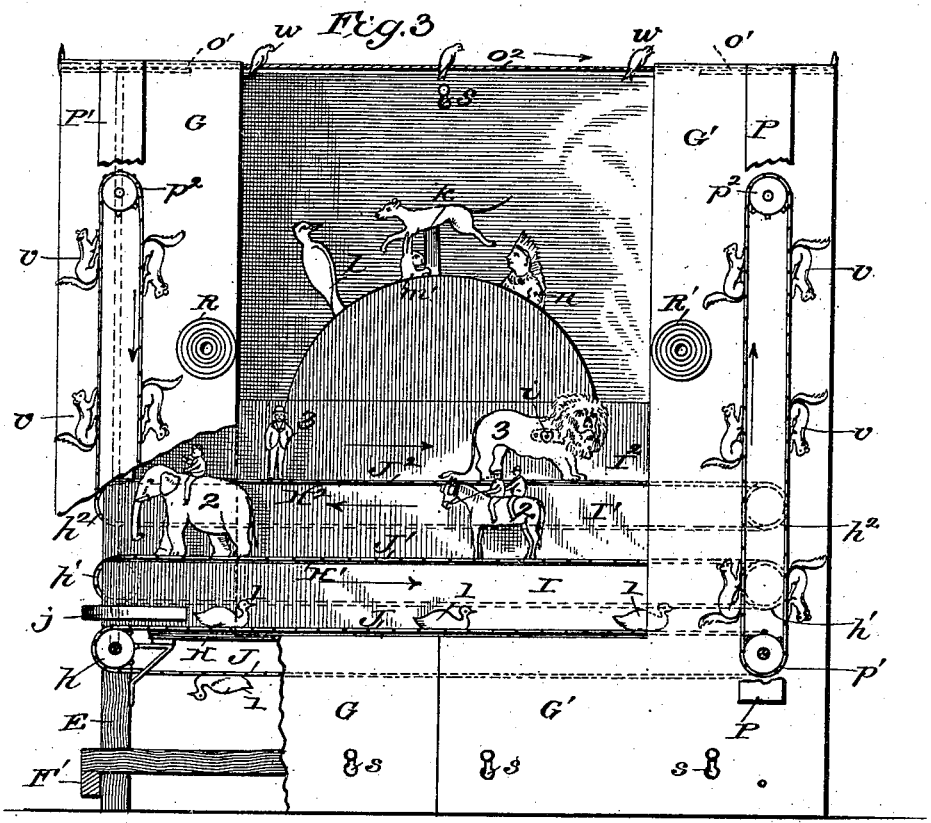
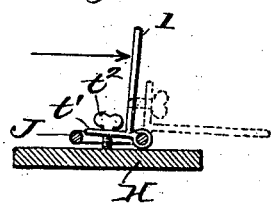
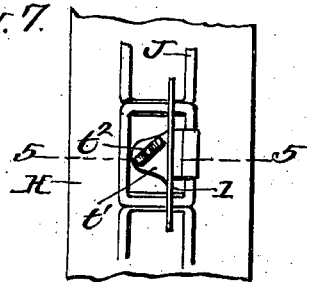
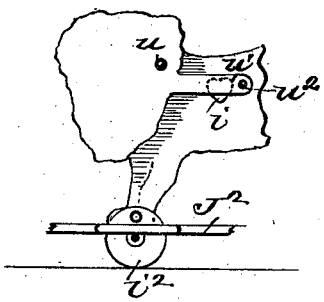
WITNESSES:
Jos. A. Ryan
Edw. W. Byrn.
INVENTOR
Charles B. Jeffers
BY Munn & Co.
ATTORNEYS.

No. 631,720. Patented Aug. 22, 1899.
C. B. JEFFERS.
SHOOTING GALLERY.
(Application filed May 12, 1899.)

(No Model.) 4 Sheets—Sheet 4.

WITNESSES: Jos. A. Ryan
Edw. W. Byrn.

INVENTOR
Charles B. Jeffers
BY Munn
ATTORNEYS.

UNITED STATES PATENT OFFICE.

CHARLES B. JEFFERS, OF LOGANSPORT, INDIANA.

SHOOTING-GALLERY.

SPECIFICATION forming part of Letters Patent No. 631,720, dated August 22, 1899.

Application filed May 12, 1899. Serial No. 716,562. (No model.)

*To all whom it may concern:*

Be it known that I, CHARLES B. JEFFERS, of Logansport, in the county of Cass and State of Indiana, have invented a new and useful Improvement in Shooting-Galleries, of which the following is a specification.

My invention is designed to provide a shooting-gallery in which there shall be a series of moving figures as targets to test the skill of the marksman and increase the zest of the amusement and in which there shall be also combined a suitable motive power and a mechanical piano or organ so arranged as to start the piano upon making a center shot or otherwise, as may be desired.

It consists in the features of mechanical combination for carrying out these results, as will be hereinafter fully described, and shown in the accompanying drawings, in which—

Figure 1 is a side elevation. Fig. 2 is a plan view. Fig. 3 is a front elevation looking in the direction of the arrow in Fig. 1 and with a part of one of the front plates broken away. Fig. 4 is a rear view, partly in section, on line 4 4, Fig. 2, looking in the direction of the arrow in Fig. 2. Figs. 5 and 7 are views of one of the movable targets on the traveling chain, Fig. 7 being a plan view and Fig. 5 a cross-section on line 5 5. Fig. 6 is a detail of another movable target. Fig. 8 is a rear view of the piano-starting target, and Fig. 9 is a rear view of the bell-ringing target.

A, Figs. 1 and 2, is a line of shafting running from the target to a position near that of the shooter. This shafting is provided with a band-pulley $a$, that is connected by a belt $a'$ to a band-wheel $a^2$ on a suitable motor B. The latter is by preference a gasolene-engine; but any other suitable motor may be employed. C is a mechanical piano whose operating parts are connected to a band-wheel $c$, which is connected by a belt $c'$ with a band-pulley $c^2$ on the line of shafting A. This band-pulley is loose on the shaft and is arranged to be connected to it by a clutch mechanism, so as to rotate with the shaft and be driven by it or be disconnected therefrom, as may be desired. For this purpose (see Fig. 1) this band-pulley has a grooved collar $a^3$ with clutch-teeth that engage clutch-teeth $a^4$ on a disk rigidly fixed to the shaft. A hand-lever D is hinged at its lower end and is provided with a fork $d$, that embraces the collar of the band-pulley $c$, and is arranged to throw it into engagement with the clutch on the shaft, and thus cause the shaft to turn and operate the piano.

The gallery proper consists (see Fig. 1) of a series of light timbers in the form of posts E E' E² E³ E⁴ on each side, with cross-bars F F', one at the top and the other at the bottom. In front of the posts E E are arranged two L-shaped mask-plates G G', of sheet metal, which protect the timbers from the bullets. Extending across the gallery from side to side are a series of travel-boards H H' H², which are arranged horizontally and on which travel the objects which constitute targets to be fired at. These boards are arranged at a gradually-increasing height toward the rear like stair-steps, and behind each one there is a vertical metal plate I I' I² to protect the timbers and objects behind from the bullets. Over each one of these travel-boards there passes the upper run of an endless sprocket-chain. The first chain J passes around sprocket-wheels $h$ $h$ at the opposite ends of the lower travel-board. The second chain J' passes around sprocket-wheels $h'$ $h'$ at the opposite ends of the second travel-board H', and the third chain J² passes around sprocket-wheels $h^2$ $h^2$ at the opposite ends of the third travel-board H². These chains have attached to them various figures, which form targets, as at 1 2 3, which glide along the upper surfaces of the travel-boards. Said chains are made to travel by connection of their respective sprocket-wheels with the main line of shafting A. For this purpose a pulley $e$ on the shaft A, behind the face of the gallery, transmits motion through a belt $e'$ to a pulley $e^2$ on the axis S of the first sprocket-wheel, and twin gears $f f$ and $g g$ transmit the power to the axes S' and S² of the other sprocket-wheels.

Objects of various sizes and kinds are intended to be carried by the sprocket-chains. The smaller ones are designed to be knocked over when struck, and the larger ones have some vulnerable point, which when struck indicates the shot. For the smaller ones (see Figs. 3, 5, and 7, which show a duck) the figure 1 is attached to a base-plate $t'$, hinged to the chain, and is provided with a set-screw $t^2$, by which it can be so delicately balanced that a bullet striking it in the direction of the arrow, Fig. 5, will throw it over on its hinge, as shown in dotted lines. A larger one (see Fig. 6, which shows a lion) has its head pivoted at $u$ and so arranged that when a representation of its heart $i$ on the outside is struck a spring-catch $u'$ is forced off a pin $u^2$ and its head drops. The larger figures are also provided with eccentric rollers $i^2$, which as they run over the travel-board give the animals the appearance of galloping.

In order to cause the smaller figures when knocked over to come up at the other end of the board in an upright position, a stationary spring-guard $j$, Figs. 2 and 3, is made to strike against them and turn them right side up.

The metal shield in rear of the upper travel-board is larger than the others and has an arched center, and behind it there are arranged other moving figures which revolve about an axis and have other movements.

K, Figs. 2 and 4, is a shaft in the middle of the gallery arranged horizontally and pointing in the line of fire. This is journaled in suitable boxes in the framework and carries a sprocket-wheel $K'$, that is connected by a chain belt $k^2$ to a sprocket-wheel $K^3$ on the same shaft $S^2$ as the sprocket-wheel of the upper travel-board. The shaft K is provided with rigidly-attached arms $k$, Fig. 4, bearing on their ends figures of animals, which when the arms revolve show above the mask-plate in front and appear to be chasing each other. The figure of an eagle is mounted on the end of an upright bar $l$, Fig. 4, which is hinged at its bottom and is connected by a rod $l'$ to a bar $n$, jointed to a wrist-pin or crank on a disk $m$ of the shaft K, so as to impart a vibratory motion to the bar and eagle. The figure of a rabbit and an Indian are also mounted, respectively, on the ends of bars $m'$ and $n$ and are arranged to be given an up-and-down movement above the circular portion of the mask-plate by being connected to the wrist-pin or crank on the disk $m$.

On the extreme rear end of the shaft $S^2$ there is a bevel-gear $o$, (see Fig. 1,) which engages a second bevel-gear $o'$ on the lower end of a vertical shaft O, which at its upper end has a horizontal grooved pulley $O'$, Fig. 2, around which passes an endless belt $O^2$ to a second grooved pulley $O^3$ on a vertical shaft $O^4$ on the other side. Upon this endless traveling belt are hung representations of birds $w$, which may be made of terra-cotta, plaster-of-paris, or other light breakable material, which are made to travel horizontally with the belt and are detachably fixed thereto.

At the front part of the gallery, on each side, there is an offsetting vertical metal plate P and $P'$, Figs. 1 and 3, and between them and the L-shaped plates G G' there is arranged on each side an endless belt $p$, running around a pulley $p^2$ at the top, and another one, $p'$, at the bottom and bearing representations of squirrels $v$, which appear at the edges of the plates P P', running up on one side and down on the other. These are also made of plaster-of-paris, terra-cotta, or other breakable material and are arranged to be quickly and easily secured to the chain. These chains are set in motion by the lower sprocket-wheels, which are fixed rigidly on the prolongation of the shafts S of the lower travel-board chain.

R R', Figs. 3, 8, and 9, are two round targets on the upright parts of the plates G G'. These targets have central holes. Behind one of them, R, and in line with its central hole is a bell composed of a triangular bit of steel $r$, Fig. 9, suspended at one of its corners, which rings when struck by a bullet passing through the central hole. Behind the central hole in the other target R' there is a movable catch $r'$, Fig. 8, which is drawn upwardly by a spring $r^2$, but held down by pin $r^4$, and is attached to a wire $r^3$, running around pulleys $q$ $q$, Fig. 1, to the hand-lever that controls the piano. When a bullet passing through the central hole of this target strikes and dislodges the catch $r'$ from pin $r^4$, the spring, pulling on the wire $r^3$, throws the hand-lever and, connecting the piano to the shaft A, starts the music.

For the easy assembling and fixing of the various parts of the sheet-metal plates in their places they are made detachable and have keyhole-slots $s$, Fig. 3, that drop over lag-screws in the timbers to hold them in place.

Instead of having the moving parts of the gallery moved by machinery they may be moved by hand or horse power, if desired.

Having thus described my invention, what I claim as new, and desire to secure by Letters Patent, is—

1. A shooting-gallery having one or more horizontal travel-boards, an endless belt or chain passing over the same, hinged targets attached to the chain, and set-screws for adjusting the balance of these targets substantially as and for the purpose described.

2. In a shooting-gallery, the combination with a suitable framework bearing a mask-plate with a circular margin; of a shaft arranged horizontally and in the line of fire behind said mask-plate, and having radial arms with target-figures mounted on the same, appearing outside the circular margin of the mask-plate, and means for rotating the shaft substantially as described.

3. In a shooting-gallery, the combination with the bullet-proof side plates having a vertical mask-plate in front of them of an endless belt arranged vertically about sprocket-wheels between the mask-plate and the side plate, and having target-figures of squirrels or other objects projecting outside the mask-plates and arranged to run up one side and down the other as set forth.

4. In a shooting-gallery, the combination of an automatic musical instrument, a horizontal shafting with clutch, a belt connecting the instrument and shafting, and a lever for controlling the clutch and connecting the instrument to the shafting, and a target having a center hole with a tripping-catch behind it, a wire connecting it with the shifting mechanism of the clutch, said catch being arranged when struck to start the instrument to playing substantially as described.

CHARLES B. JEFFERS.

Witnesses:
GEORGE S. KISTLER,
GEO. A. CUSTER.